US008392256B2

(12) United States Patent
Flombaum et al.

(10) Patent No.: US 8,392,256 B2
(45) Date of Patent: Mar. 5, 2013

(54) SYSTEM AND METHOD FOR IDENTIFYING AND RETRIEVING TARGETED ADVERTISEMENTS OR OTHER RELATED DOCUMENTS

(75) Inventors: Avichai Flombaum, Bronx, NY (US); Jacob L. Slevin, Tenafly, NJ (US)

(73) Assignee: Really Simple LLC, New York, NY (US)

( * ) Notice: Subject to any disclaimer, the term of this patent is extended or adjusted under 35 U.S.C. 154(b) by 704 days.

(21) Appl. No.: 12/550,063

(22) Filed: Aug. 28, 2009

(65) Prior Publication Data

US 2010/0257049 A1    Oct. 7, 2010

Related U.S. Application Data

(60) Provisional application No. 61/166,485, filed on Apr. 3, 2009.

(51) Int. Cl.
*G06Q 30/00* (2006.01)
(52) U.S. Cl. ............... 705/14.42; 705/14.41; 705/14.4; 705/14.43
(58) Field of Classification Search ............... 705/14.4, 705/14.41, 14.42, 14.43
See application file for complete search history.

(56) References Cited

U.S. PATENT DOCUMENTS

| | | | |
|---|---|---|---|
| 7,836,060 B1 * | 11/2010 | Rennison | ........................ 707/749 |
| 2008/0065602 A1 | 3/2008 | Cragun et al. | |
| 2008/0275863 A1 | 11/2008 | Dominowska et al. | |
| 2008/0294524 A1 | 11/2008 | Badros et al. | |
| 2009/0070310 A1 | 3/2009 | Srivastava et al. | |

OTHER PUBLICATIONS

International Search Report and Written Opinion for International Application No. PCT/US2010/029638 dated dated May 12, 2010.

* cited by examiner

*Primary Examiner* — Raquel Alvarez
(74) *Attorney, Agent, or Firm* — Stroock & Stroock & Lavan LLP

(57) ABSTRACT

A computer system, computer program, and related methods product for selecting one or more targeted advertisements to be displayed along with a set of search results. In general, a computer system and database storage system store one or more campaigns associated with a set of documents and at least one advertisement. The computer system is programmed with an ad targeting module to: identify all campaigns that have at least one document relating to a search result set; analyze the search results set to calculate at least one intersection score between the search result set and at least one of the one or more campaigns; select a matching campaign from the one or more campaigns based on the at least one intersection score, select at least one advertisement from the matching campaign; and cause the at least one advertisement selected from the matching campaign to be displayed with the search result set.

33 Claims, 12 Drawing Sheets

SYSTEM AND METHOD FOR IDENTIFYING AND RETRIEVING TARGETED ADVERTISEMENTS OR OTHER RELATED DOCUMENTS

CROSS-REFERENCE TO RELATED APPLICATIONS

This application claims priority to U.S. Provisional Application Ser. No. 61/166,485, filed Apr. 3, 2009, the entire disclosure of which is incorporated herein by reference.

BACKGROUND OF THE INVENTION

1. Field of the Invention

The embodiments of the present invention relate to systems and methods for identifying and retrieving targeted advertisements or documents related to one or more search requests.

2. Description of the Related Arts

Online search has exploded over the past few years, both in horizontal and vertical sectors. This in turn has provided more and more opportunity for targeted advertising. Online search platforms selling targeted advertising include, but are not limited to, Google, Yahoo, and Live.

Presently, there are known to the inventor(s) two methods for serving targeted advertisements: keyword advertising and contextual advertising. With keyword advertising, advertisers select and purchase a keyword (or multiple keywords) to activate when an advertisement is displayed. For example, an advertiser might purchase the keyword 'toilets' from Google. When a visitor to Google is searching for the matching query 'toilets,' a corresponding advertisement is typically displayed. When a visitor is searching for 'chairs,' the 'toilet' advertisement will typically not be displayed, because contextually chairs may not be considered relevant to toilets. In recent years, keyword advertising has been expanded somewhat to work with a synonym dictionary such to broaden opportunity for serving a keyword advertisement, but the core logic remains the same, beginning and ending with the keyword.

Contextual advertising builds upon keyword advertising but extends the application to non-search web pages. In one such example, Google AdSense technology scans the text displayed on a participating web page for keywords, and then returns advertisements to that web page based on dominant keywords. Again, this method begins and ends with the keyword.

Accordingly, the above referenced methods require that an advertiser must first identify and purchase all relevant keywords, which is a growing challenge in today's information-based world, and may present insurmountable challenges in vertical sectors. For example, expanding on the same 'toilets' example above, what is to occur when a visitor is searching for either 'tankless toilets' or 'wall mount lavatories'? The 'toilets' advertisement may not be displayed and the advertiser will have lost an opportunity to present its wares or services to a buying customer. Because of these technical problems with using keyword-based advertising, entire industries have developed where consultants are paid to improve the effectiveness of an advertiser's targeted keyword based ads.

Thus, due to the present inefficient methods for displaying targeted advertisements, much inventory rests unsold, and therefore wasted.

The invention described herein presents new systems and methods for serving targeted advertisements—referred to herein as result-based advertising. Generally speaking, the above-described technical problems are solved, in while or in part, by a technical solution in which advertisements are displayed based on the results returned in response to any given query, not matching keyword(s).

SUMMARY OF THE INVENTION

In accordance with various embodiments of the invention, systems and methods allow advertisers to place targeted ads on web pages displaying the search results based on the set of results' similarity to one or more predefined campaigns. In such embodiments, the ads that are selected may not be directly related to the search query or keywords used, but rather are chosen based on the similarity of the results set to predefined campaigns.

In one embodiment, in particular, systems and methods are provided for targeting advertisements to users of a search engine in which the targeted advertisements are selected, at least in part, based on the intersection of search result documents and predefined sets or collections of documents in order to increase the advertisements' displays and relevancy to the search query.

In another embodiment, for example, one or more targeted advertisements are selected according to the following computer implemented process: (i) analyzing a search result set generated by a search engine in response to a keyword, using the build campaign match sub-module of the ad targeting module, to calculate at least one intersection score between the search result set and at least one of the one or more campaigns; (ii) selecting a matching campaign from the one or more campaigns, using the choose best campaign sub-module, based on the at least one intersection score, and (iii) selecting at least one advertisement from the matching campaign, using the choose advertisement sub-module; and (iv) causing the at least one advertisement selected from the matching campaign to be displayed with the search result set.

A system for selecting one or more targeted advertisements to be displayed along with a set of search results, the system comprising: a computer system programmed with an ad targeting module including a build campaign match sub-module, a choose best campaign sub-module, and a choose advertisement sub-module; a database storage system storing one or more campaigns each campaign being associated with a set of documents and at least one advertisement; wherein the computer system executes the ad targeting module to: (i) identify all campaigns that have at least one document relating to a search result set generated by a search engine in response to a keyword; (ii) analyze the search results set, using the build campaign match sub-module of the ad targeting module, to calculate at least one intersection score between the search result set and at least one of the one or more campaigns; (iii) select a matching campaign from the one or more campaigns, using the choose best campaign sub-module, based on the at least one intersection score, (iv) select at least one advertisement from the matching campaign, using the choose advertisement sub-module; and (v) cause the at least one advertisement selected from the matching campaign to be displayed with the search result set.

A computer program product including a computer usable medium having a computer readable program code embodied therein, said computer readable program code adapted to be executed to implement a method for selecting one or more targeted advertisements to be displayed along with a set of search results, said method comprising: providing a system including a computer system and a database storage system storing one or more campaigns each campaign being associated with a set of documents and at least one advertisement, the computer system programmed with distinct software modules, and wherein the distinct software modules include an ad targeting module including a build campaign match sub-module, a choose best campaign sub-module, and a choose advertisement sub-module; identifying all campaigns that have at least one document relating to a search result set generated by a search engine in response to a keyword; analyzing the search results set, using the build campaign match sub-module of the ad targeting module, to calculate at least one intersection score between the search result set and at least one of the one or more campaigns; selecting a matching campaign from the one or more campaigns, using the choose best campaign sub-module, based on the at least one intersection score, selecting at least one advertisement from the matching campaign, using the choose advertisement sub-module; and causing the at least one advertisement selected from the matching campaign to be displayed with the search result set.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

Embodiments of the invention will be described and shown in detail by way of example with reference to the accompanying drawings in which.

DETAILED DESCRIPTION OF THE PREFERRED EMBODIMENTS

Overview

Figure 1A:
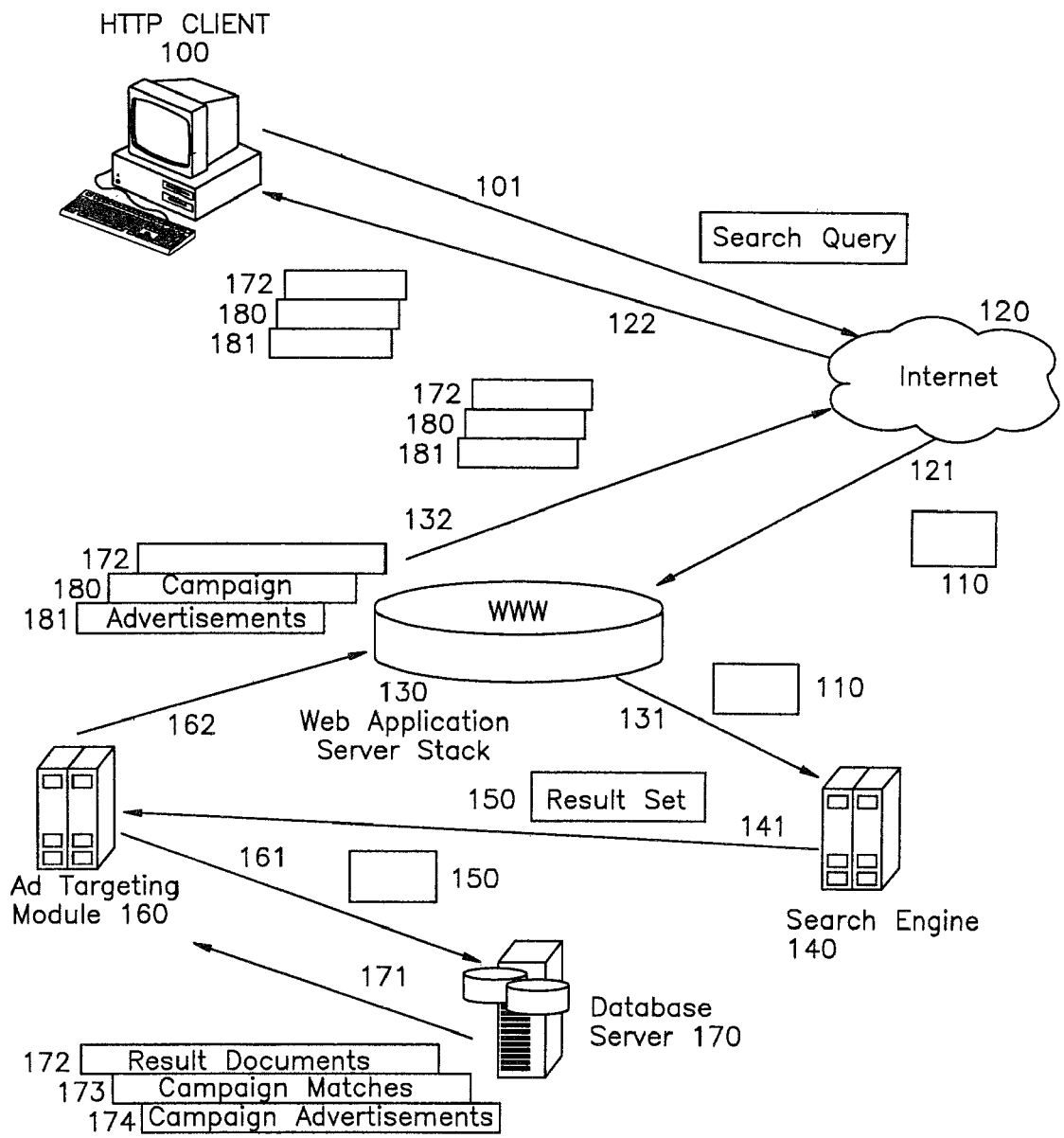
FIG. 1a is a high-level schematic diagram depicting a system architecture in accordance with one or more embodiments of the invention.

The present invention relates to systems and a methods for presenting a user with selected, targeted advertisements attached to a selected campaign containing any number of advertisements and documents.

In accordance with a preferred embodiment of the present invention, and as further shown in FIG. 1, a search advertisement generation system 100 includes a web application server stack 130 capable of communication via a network with database server 170. Also, in communication with the web application server stack 130 and the database server 170 is a computer system configured as a search engine 140 and another computer system configured as an ad targeting module 160.

References herein to computers, computer systems, or servers refer to computer processing units, such as computer servers, personal computers or workstations. Although not depicted in the figures, the one or more computers referenced herein generally include such art recognized components as are ordinarily found in such computer systems, including but not limited to processors, RAM, ROM, hard disks or other computer readable mediums, clocks, hardware drivers, associated storage, and the like. References herein to the term "database," "database system," or "database server" generally refer to one or more storage devices or computers with storage media storing a collection of records or data, as well as software for managing such records or data (commonly known as a database management system (or DBMS)). The database may take the form of a relational, hierarchical, network, or other known structure as may be deemed to be most efficient. In a preferred embodiment, the present invention employs a relational database to store the various associations of data described herein.

Furthermore, each of the computer systems described herein preferably includes a network connection (not shown). The network connection may be a gateway interface to the Internet or any other communications network through which the systems can communicate with other systems and user devices. The network connection may connect to the communications network through use of a conventional modem (at any known or later developed baud rate), an open line connection (e.g., digital subscriber lines or cable connections), satellite receivers/transmitters, wireless communication receivers/transmitters, or any other network connection device as known in the art now or in the future.

Such computers and database systems may be in communication via a secure local or wide area network. In a preferred embodiment, web application server stack 130 and the client computer systems 100 are configured in a server-client architecture, as is known in the art, with the web application server stack 130 functioning as the server for providing at least web search functionality to each of the client computers 100 that may be communicatively connected to web application server stack 130 at any given time.

One skilled in the art will recognize that the computer systems may as a matter of design choice include any number and configurations of computers and databases, which may be used separately or in tandem to support the traffic and processing needs necessary in operation at one time. If multiple computers are used, the computers may be configured using a round-robin configuration to handle end user traffic.

A computer program product, such as an optical, magnetic or other type of data storage device, may be included or provided that includes software for programming the computers to perform the desired functions. The product may include a computer usable medium having computer readable program code means embodied therein for providing the desired functions.

Figure 1B:
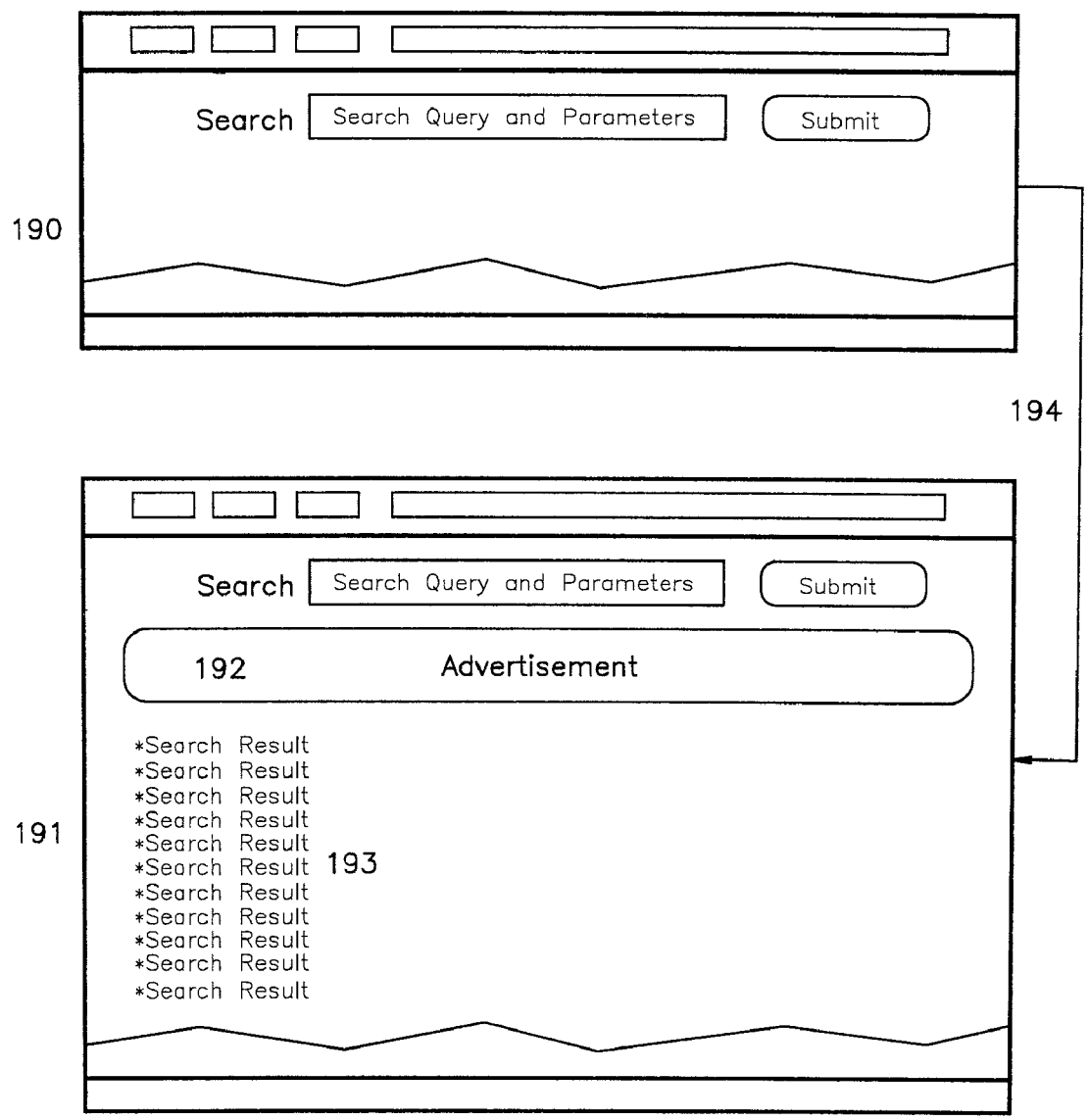
FIG. 1b depicts a graphical user interface (GUI) in which a user conducts a search on a website and is presented with search results and an advertisement in accordance with one or more embodiments of the invention.
Figure 2A:
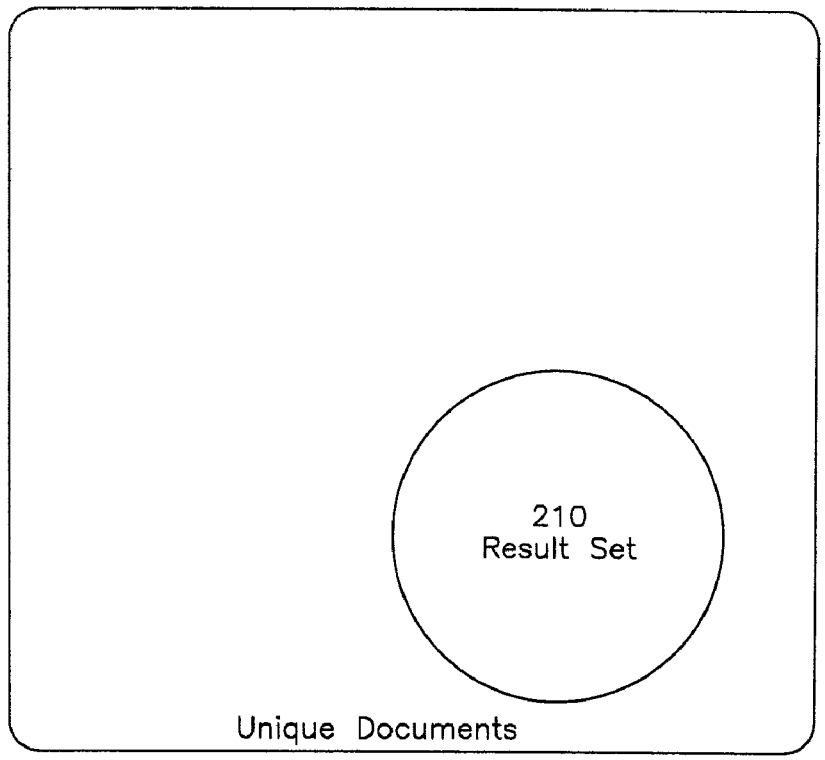
FIG. 2a is a diagram illustrating a relationship of a Result Set as a group, set, or collection of unique documents within all possible unique documents stored in a database in accordance with one or more embodiments of the invention.

According to one embodiment of the present invention, as shown in FIGS. 1*a* and 1*b*, an HTTP Client 100, embodied by a Web Browser on a client's computer, mobile device, or any system or apparatus capable of rending Web Content including but not limited to HTML, sends a Search Query 110, 194, over a communication network, in step 101, connected to the Internet or other public network 120, to Web Application Server Stack 130. The Web Application Server Stack 130 preferably is a system that is capable of responding to HTTP requests and is commonly composed of a load balancer, firewall, and application server running on a computer server connected to the Internet or other network 120. In step 121, the web application server stack 130 receives a search query 110 having one or more search terms and provides such search query terms 110 to the Search Engine 140, in step 131. In step 141, the Search Engine returns a Result Set 150, 210 (see FIG. 2*a*), or 260 (see FIG. 2*b*) composed of Documents or references to Documents matching the terms searched.

Figure 2B:
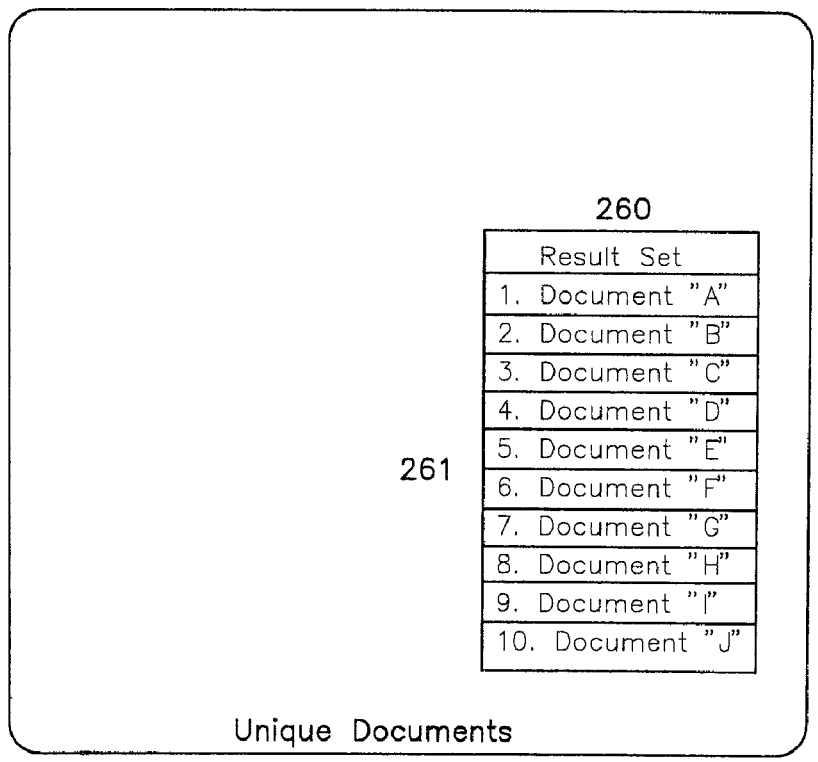
FIG. 2b is a diagram illustrating an alternative configuration of a Result Set ordered in a hierarchical structure in accordance with one or more embodiments of the invention.

Such Documents can be documents in a database, document store, search index, or any system capable of storing unique document data, composed of any number of properties and attributes. Such Result Sets 150, 210, 260, composed of Documents and returned by the Search Engine 140 are organized and ordered, for example, as a hierarchical structure based on the relevance of the document to the search term or a hierarchical structured organized alphabetically by a documents property, such as name or ID 261 (FIG. 2*b*).

The Search Engine 140 then sends the Result Set, in step 141, to the Ad Targeting Module 160. The Ad Targeting Module 160 pairs the search query and result set to a selected campaign 180 containing one or more documents using the intersection of the result set's documents and the documents in all the existing campaigns. The ad targeting module 160 then preferably selects the most appropriate advertisements from the selected campaign's advertisements 181 based in part, upon the search query and the result set, as determined by the ad targeting module 160.

The selected campaign 180, selected advertisements 181, and result set 150 are then returned to the Web Application Server Stack 130, in step 162. The Web Application Server Stack in turn presents, in step 132, the user 122 with a search results page 191 (FIG. 1*b*) composed of the result set documents 193 along with the selected advertisements 192 (FIG. 1*b*) from the selected campaign.

A Unique ID for an element can be numerical such as 1, 2, 3, etc., or can be GUID (globally unique identifiers) strings that uniquely identify a specific element. In a preferred embodiment, as long as no other element of the same type has the same value for their IDs, an ID is considered a primary key, a unique identifier of a specific element.

Figure 3:
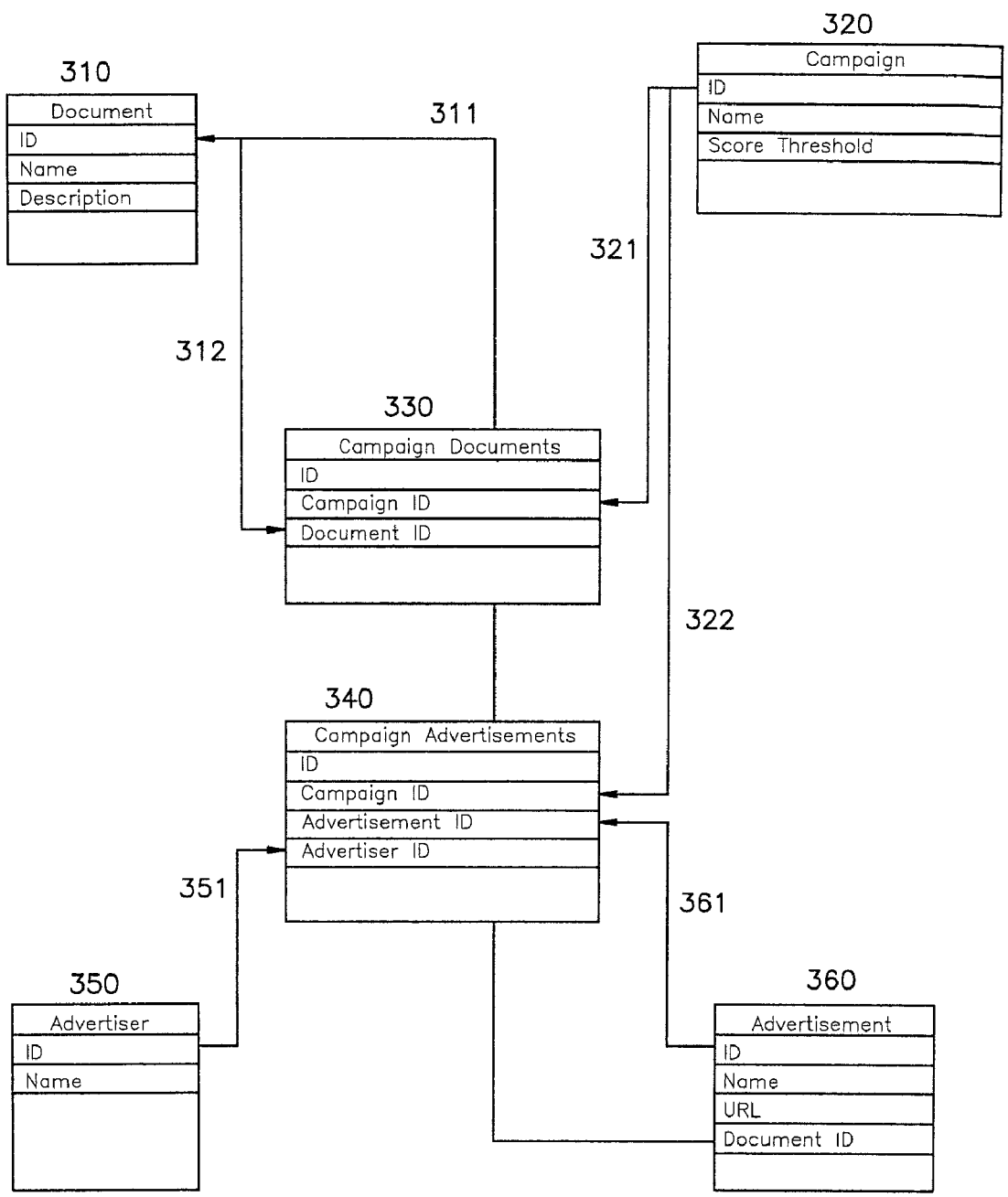
FIG. 3 is a diagram that represents an exemplary data model for a Result Set, including elements, their attributes and relationships in accordance with one or more embodiments of the invention.

With reference now to FIG. 3, there is shown and described an embodiment of a database structure for organizing information in accordance with the present invention. An Advertiser category defines a client that owns Advertisements in a Campaign, as shown in FIG. 3 by category 350. By way of example, an Advertiser might be an Office Furniture manufacturer such as Knoll. Category 350 represents the Advertiser's data element and its possible attributes, such as a name. An Advertiser may have many Campaign Advertisements, as show in 351. Each Campaign Advertisement belongs to an Advertiser through a foreign key reference to the Advertiser's unique ID, as shown in 351. Through this relationship, an Advertiser can have many Campaigns and Advertisements, as both those entities are connected to Campaign Advertisements with similar foreign key references to their respective unique IDs, as shown in 361 and 322.

An Advertisement is the data that will be displayed if this Advertisement is selected through the ad targeting module 160, as shown in FIG. 3 as category 360. By way of example, an Advertisement might be a rectangular image that promotes a particular office chair or line of office chairs by an Office Furniture manufacturer such as Knoll. Category 360 represents the Advertisement's data element and its possible attributes, such as a name or a URL to an image to be used as banner, or a foreign key reference to a Document ID to be displayed as a sponsored result, as shown in the relationship 311. Thus, an Advertisement may be both an image-based banner, as described above promoting an office chair or a line of office chairs, or it might be a Document that represents the office chair or a line of office chairs. Relationship 311 demonstrates that an Advertisement might belong to a Document. An Advertisement may have many Campaign Advertisements, as shown in 361. Each Campaign Advertisement belongs to an Advertisement through a foreign key reference to the Advertisement's unique ID, as shown in 361. Through this relationship, an Advertisement can have many Campaigns and Advertisers, as both those entities are connected to Campaign Advertisements with similar foreign key references to their respective unique IDs, as shown in 351 and 322.

A Document is a unique item with properties such as a name, a description, as shown in FIG. 3 as category 310. By way of example, a Document might be a specific and unique office chair within a database or index of office furniture products. Another example of a Document might be a specific web page defined by its unique URL within a database or index of web pages. Documents can be indexed by a database or a separate indexer system so to provide a broad and efficient method to search through all the documents. A Document may have many Campaign Documents, as shown in 312. Each Campaign Document belongs to a Document through a foreign key reference to the Document's unique ID, as shown in 312. Through this relationship, a Document can have many Campaigns, as Campaigns are connected to Campaign Documents with a similar foreign key reference to its unique ID, as shown in 321. A Document can also have many Advertisements, as shown in 311, where the Advertisement then becomes a reference to the original document through the foreign key reference in the Advertisement to the Document's unique ID, as shown in 311.

Figure 4:
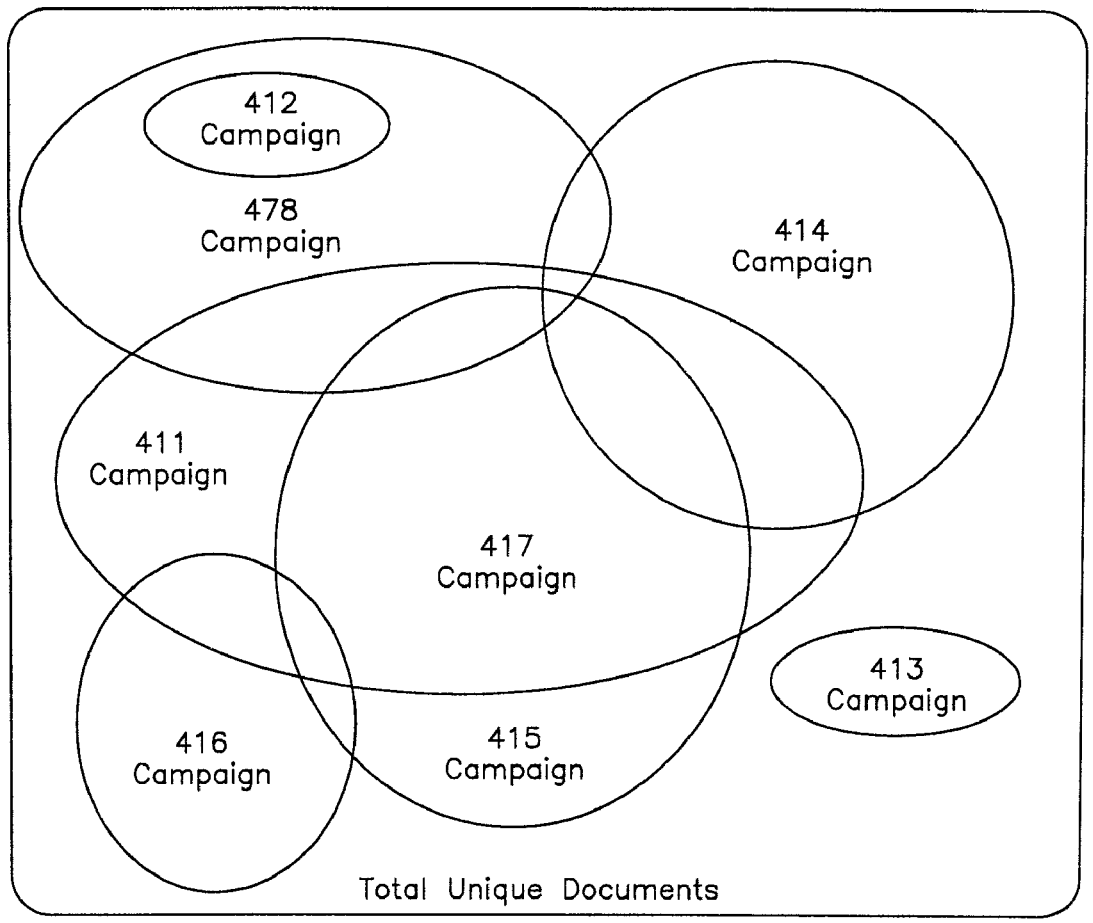
FIG. 4 is a diagram illustrating how a collection of unique documents may be divided into campaigns composed of subsets of documents in accordance with one or more embodiments of the invention.
Figure 4:
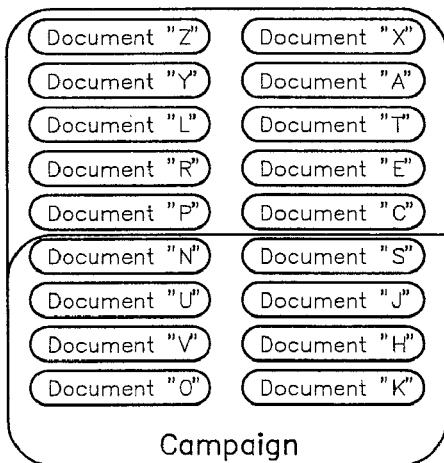
Figure 4:
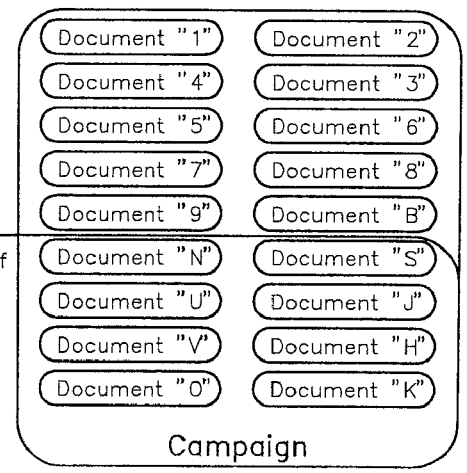

A Campaign is a set, group, or collection of unique Documents, as shown in FIG. 4 by elements 420 and 430, and FIG. 3 as category 320. For example, element 410 of FIG. 4 depicts a number of campaigns 411-418, which as can be seen in some instances contain overlapping areas. These overlapping areas, such as the overlap between campaigns 411, 412, 414, 415, 416, 417, and 418, show the intersection of documents within such campaigns. Element 440 shows the intersection between campaign documents 420 and campaign documents 430.

By way of further example, a Campaign might include "Office Chairs," which would include all the unique office chairs within a database or index of office furniture, such that all the unique documents would represent every unique office furniture item and the "Office Chairs" campaign would represent every unique office chair. Another example of a Campaign might be "Ruby on Rails Websites," which might include a single unique domain such as <<http://api.rubyonrails.org>>, within a database or index of all the web pages. Documents in a Campaign can be related to each other in some manner, for example, being in the same category of office furniture or being in the same topic as Ruby on Rails, or Documents in a Campaign can share no relation and be an arbitrary grouping of Documents.

A Campaign can have properties such as a name, and the score threshold that define its behavior within the ad targeting module, as shown in 320. A Campaign can have many Campaign Documents, as shown in 321. Each Campaign Document belongs to a Campaign through a foreign key reference to the Campaign's unique ID, as shown in 321. Through this relationship, a Campaign can have many Documents, as Documents are connected to Campaign Documents with a similar foreign key reference to its unique ID, as shown in 312. A Campaign can also have many Campaign Advertisements, as shown in 322. Each Campaign Advertisement belongs to a Campaign through a foreign key reference to the Campaign's unique ID, as shown in 322. Through this relationship, a Campaign can have many Advertisements and Advertisers, as Advertisements and Advertisers are connected to Campaign Advertisements through a similar foreign key reference to their respective unique IDs, as shown in 361 and 351.

Additionally, a Campaign might contain certain constraints or properties that govern whether the Campaign qualifies against a result set, such as, but not limited to, a 'I/C threshold' or a combination of properties such as 'percent of rank' and a 'required rank' property that would enforce that the campaign have an intersection to a result set that is composed of certain percentage of documents within a certain rank of the ordered result set.

Campaign Documents join together the separate entities, Campaigns and Documents, as shown in FIG. 3 as category 330, and relationships 321 and 312, respectively. Campaign Documents allow Campaigns to have many Documents. An "Office Chairs" Campaign, for example, might have any number of Documents that are office chairs. Additionally, a Campaign Document might also contain certain constraints or properties of this document within the campaign, such as, but not limited to, 'minimum rank.' The minimum rank property defines that the Campaign Document must be within a certain rank within the organic result set or even a 'required results' property, where a Campaign Document must be present along with certain required results. These types of Properties advantageously allow for Campaigns to be constrained based on additional parameters for the intersection, such as ranking and weighting based on the location of the intersection within a result set.

Campaign Advertisements may also join together the separate entities, Campaigns, Advertisers, and Advertisements, as shown in FIG. 3 as category 340, and relationships 322, 351, and 361, respectively. Campaign Advertisements allow Campaigns to have many Advertisements and Advertisers. An "Office Chairs" Campaign, for example, might have any number of Advertisements that are office chairs by any number of different Advertisers that are manufacturers of office chairs.

Exemplary Architecture

As described above, an exemplary system architecture includes, but is not limited to, the ad targeting module 160, a web application server stack 130, a database server 170, and a search engine or search indexer 140.

In a preferred embodiment, the web application server stack is composed of a NGinx web server and load balancer, sending requests to a cluster of Mongrel web servers. NGinx is responsible for receiving HTTP requests and distributing them to Mongrels or serving the content itself. In this capacity, NGinx preferably functions as both a load balancer and a web server.

Other systems to achieve this end, include, but are not limited to, Apache with HAProxy, and any software or system that accepts HTTP requests and distributes them for processing by a web application.

A web application is software that employs programming code to respond to requests according to business rules and application logic so that the correct content is rendered or compiled and sent as an HTTP response. In the present embodiment being discussed, the web application may be written in the Ruby programming language and utilizes the Ruby on Rails web application framework. Other languages and frameworks for web applications include, but are not limited to, VB, ASP, .Net, C#, Java, PHP, Perl, and Python and their respective web application frameworks, such as Hibernate, Symphony, CakePHP, and Django. Many programming languages can be employed to build a web application that can receive HTTP requests and respond with the intended web content.

The ad targeting module 160 described herein, may be built into or utilized by the web application to serve the correct ad along with search results. The ad targeting module 160 may use any type of programming language and web application server stack known in the art, given that the stack is configured to receive and respond to HTTP requests through an application that includes components that perform the functionality and processing described herein.

In addition to the web application server stack 130, a database server 170 may be employed to store data, such as documents. MySQL may be used as an application functioning as a database server. Other servers include, but are not limited to, Oracle, Microsoft SQL, and PostreSQL. Any system or software that is built to store data for retrieval could be coupled to the aforementioned web application server stack to function as its database server.

Additionally, because databases are built to store content and retrieve content based on simple parameters such as unique IDs or primary keys, those functionalities are optimized at the expense of the database's ability to search through the documents. Thus, a search engine or search index may be added to index and compile data in such a manner that makes searching the data more efficient. Certain databases, such as MySQL, support indexing content for fast searching, however, their performance compared to a separate search engine, search index, or search daemon has proven to be poor. In the present embodiment being discussed, both MySQL indexes and the Sphinx search engine are used to search through documents for matches based on text queries and filters. Other systems and software to achieve this functionality include, but is not limited to, Solr, Ferret, and Lucene. Any software or system that can index and compile data in such a way as to allow for it to be searched and queried using arbitrary text, filters, and parameters, would be considered a search engine. Joined together, these separate systems and software packages create a web application server stack that allows a user to search its domain of documents via search queries, filters, or parameters and responds with matching content to the best of its ability along with an advertisement chosen via the ad targeting module 160.

As described above, the various embodiments of the present invention is related to serving advertisements to users as they are searching for documents on a website or on the world-wide-web, in whole or in part. By way of example, various embodiments of the invention will be described, in one instance, in the context of architectural and design products within a catalog of products. A product represents a document with the attributes, name, manufacturer, default image, category, and tags, among others.

By way of further example, on Google, a document is represented by a website, with the attributes of URL, name, and description, among others. It is contemplated that the term 'documents' as used and defined by the various search engines, such as Google, Yahoo!, MSN, etc., are within the scope of the present invention. As such, the present invention can be applied to search results for web-based documents through a search engine, such as Google, to retrieve and target advertisements based thereon.

Documents can be created and added to the application, generally stored in the database and indexed by the search engine, in a variety of ways, including but not limited to, crawling or scraping websites for content with which to create documents, manually creating documents with their attributes through a GUI or backend, whether by users, user-generated content, or by the site owner or administrators, or via an upload or bulk upload functionality. A document's attributes are generally used as the basis for a search engine to be queried against, for example, in the present embodiment a product's name, manufacturer, category, description, and tags are indexed so that users can search for products within a certain category, by a certain manufacturer, or with certain tags, with text matching against the name and description.

Given a domain of total documents, in this embodiment all the products within a product catalog, or in the context of a search engine (e.g., Google, Yahoo! or Bing), all the websites within its index, it is possible to groups these documents into subsets, as previously defined as campaigns. These subsets of documents can share topical correlation. In the current embodiment such an example is a campaign "Office Furniture," which contains all products that are office furniture. A user or the specific subset of users that are advertisers, or an administrator, could create these groupings and campaigns using a GUI.

Figure 6:
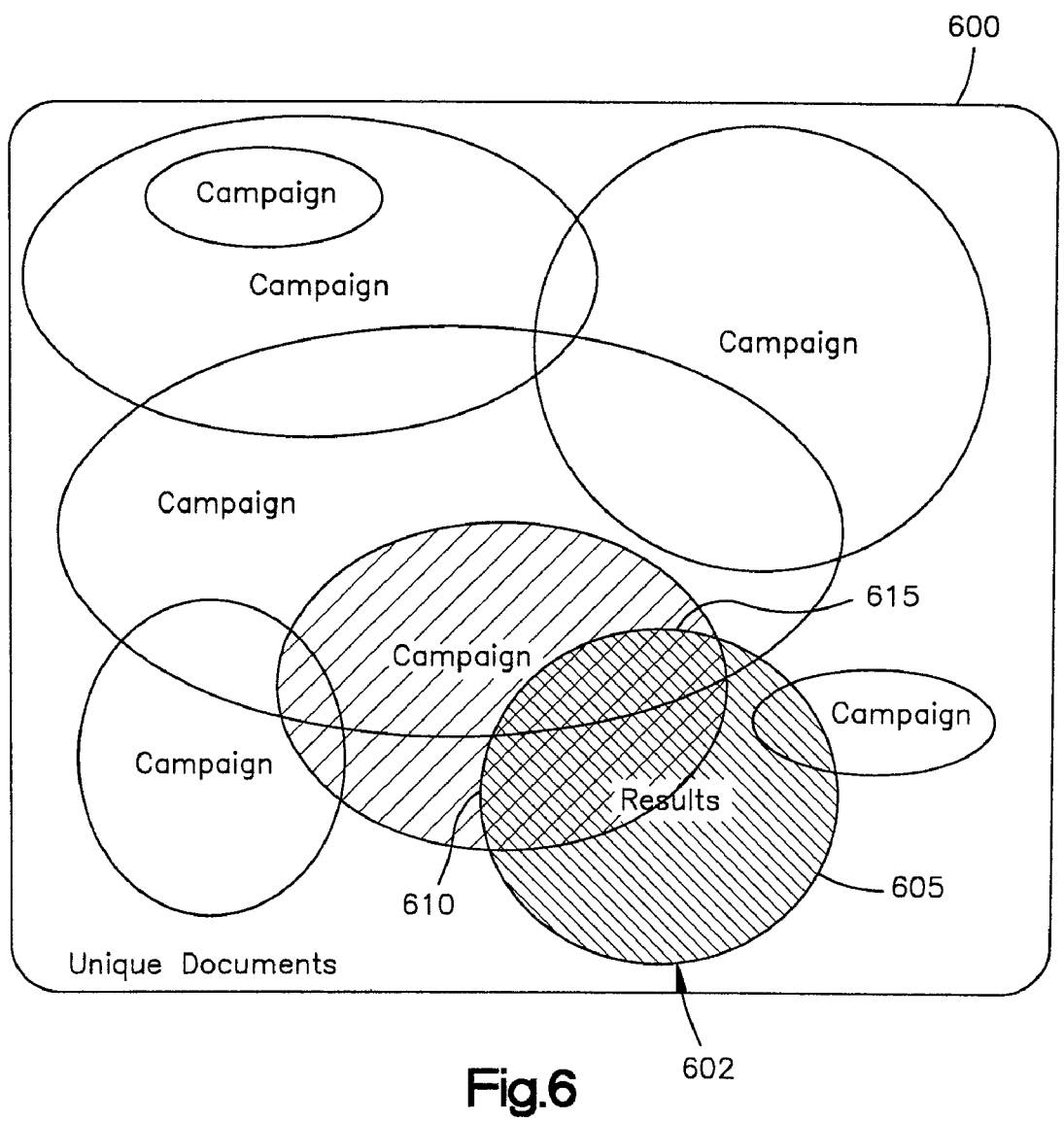
FIG. 6 is a diagram illustrating how a series of unique document collections and a result set may overlap to create an intersection in accordance with one or more embodiments of the invention.
Figure 7:
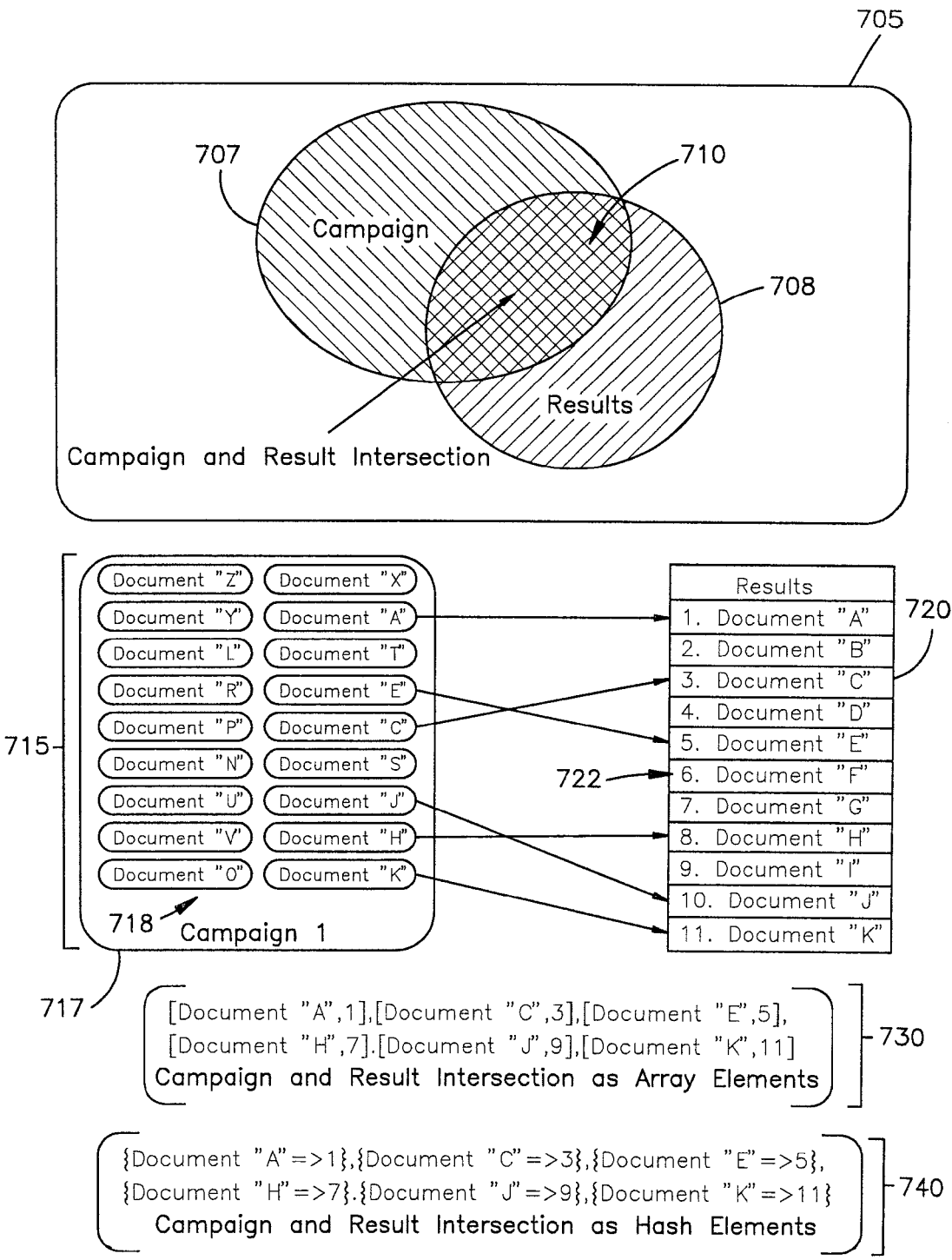
FIG. 7 is a diagram illustrating the relationships between collections, result sets, and intersections in accordance with one or more embodiments of the invention.

The documents placed into a campaign would typify the documents which if present in search results, would add the campaign to the possible campaigns for that search. That is to say, if the products that are reception desks are added to the "Office Furniture" campaign, a search for "reception desks" would return most of those products. Based on this intersection of search results and products from the "Office Furniture" campaign, the ad targeting module 160 can infer that a search for "reception desks" should display advertisements from "Office Furniture," as is generally shown in FIGS. 6 and 7. The ad targeting module 160 is configured to base these decisions, not on the search keywords, but rather on the results set, i.e., what products are displayed in response to the search query. Advertisers are thus given the opportunity to go beyond keyword-based advertising or contextual advertising, to result-based advertising.

Creating a campaign identifies the documents that represent the likely results for searches in an advertiser's interest or target. Once campaigns have defined, the body of all unique documents in a domain into sets, advertisements may be associated to campaigns.

Figure 5:
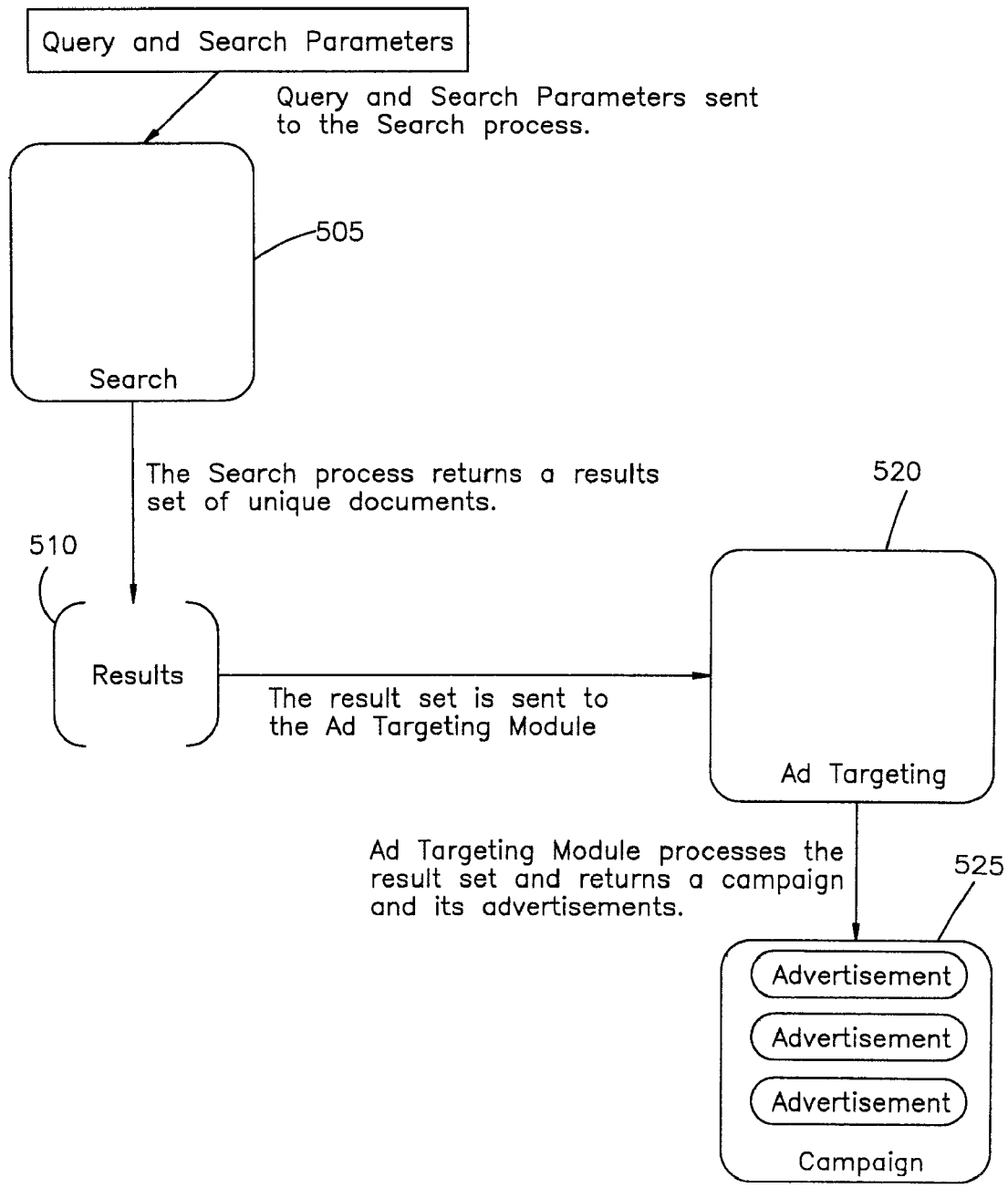
FIG. 5 is a flow diagram depicting a process for retrieving targeted advertisements in accordance with one or more embodiments of the invention.

In a preferred embodiment, the ad targeting module 160 is configured to display any number of advertisements from any number of advertisers, once a campaign is associated to a search. An overview of the operation of the ad targeting module 160 is shown in FIG. 5. First, query and search parameters are transmitted to a search engine, in step 505. Next, in step 510, a results set is generated by the search engine. Then, in step 515, the results are passed to the ad targeting module. In step 520, the ad targeting module processes the results set and returns a campaign and its advertisements. The final ad results are displayed in step 525.

Advertisements, as defined above, can be both documents from within the domain or a URL to a banner ad unit, or text for a text advertisement. In the present embodiment, advertisements are products. Thus, an advertiser decides upon a campaign of interest and adds products as possible advertisements for the campaign. In another embodiment, an advertiser might add text advertisements or banner ad URLS to a campaign as advertisements. Advertisements might be maintained for an advertiser by an administrator, site owner, or employee, or another agent such as a media-buyer, or through a self-service interface like Google Adwords.

Defining campaigns and adding advertisements to them creates an exemplary environment for serving result-based advertisements for search. A user comes to the website and conducts a search using any combination of keywords, filters or parameters. The employed search engine returns results from its index of documents within the domain. These organic search results 602 (see FIG. 6) are but a set of unique documents within a domain, much like a campaign, and ordered in some hierarchical manner as predefined. A result set of documents has the potential to overlap with any number of campaigns' sets of documents, creating various intersections 610, 615, as shown in diagram 600 of FIG. 6. These intersections represent documents that are present in both the campaign and the result set. The composition of intersections varies where certain campaigns contain none of the result set 605 while others contain varying percentages or portions of multiple campaigns (e.g., results segments 610, 615, respectively).

By way of further example, FIG. 7 depicts an illustration of the intersection between a campaign and a results set in four forms: (i) in box 705, intersection 710 of campaign 707 and results 708 is shown as overlapping zones; (ii) segment 715 shows a campaign 717 with documents 718 intersecting with a plurality of documents 722 in results set 720; (iii) in array 730, campaign and results intersection is depicted as an array; and (iv) in hash 740, campaign and results intersection is depicted as a hash.

Additionally, these intersections represent how much of the result set is composed of each campaign, where a campaign may compose a small percentage of the result set, while one campaign will have the largest composition. These intersections can also respect the order of the document within the result set, so that one campaign might have a majority its intersection composed of documents ranked highly in the result set, while another campaign might have a majority of its intersection composed of documents ranked poorly in the result set. Thus, the following variables can be defined:

C—Campaign Size: The amount of documents in the campaign.

R—Results Size: The amount of results in the result set.

I—Campaign and Result Intersection: The documents that appear in both the result set and the campaign set along with the document's position within the result set.

A variety of formulas using the variables derived from the composition of a result set and document can be employed to further describe the relationship of a campaign and search results, such as, but not limited to:

PC—Percentage of Campaign: The percentage of documents in the campaign that are in the campaign and result intersection. Formula: $100*(I/C)$ PR—Percentage of Results: The percentage of documents in the result set that are in the campaign and result intersection. Formula: $100*(I/R)$ CR—Campaign to Results Ratio: The ratio of campaign size to results size. Formula: $(I/R)$ RC—Results to Campaign Ration: The ratio of results size to campaign size. Formula: $(R/C)$ Additionally, variables that maintain a sense of a intersection's ranking within results might be defined, such as, but not limited to:

T50—Amount of documents within the top 50% of the results.

B50—Amount of documents within the bottom 50% of the results.

It is the function of the ad targeting module 160 to calculate the various intersections of campaigns and a result set, and then using the available variables and formulas, and select the most appropriate campaign and advertisements.

Overview of Ad Targeting Process

The ad targeting process begins outside of the component of the ad targeting module 160. First, a result set must be generated by a system or software functioning as a search engine. The application is programmed to receive a result set from a search engine and send it to the ad targeting module 160, which will return a campaign and advertisements.

The various possible configurations and embodiments of system, software, and architecture surrounding the ad targeting module 160 may be configured in any number of ways as is known in the art, provided such configurations create the exemplary environment for the ad targeting module 160 to function. As described above, this environment is composed of a domain with documents, campaigns, and advertisements, that has a search engine and application configured to process searches from users and deliver results to the ad targeting module 160 for processing.

Figure 8:
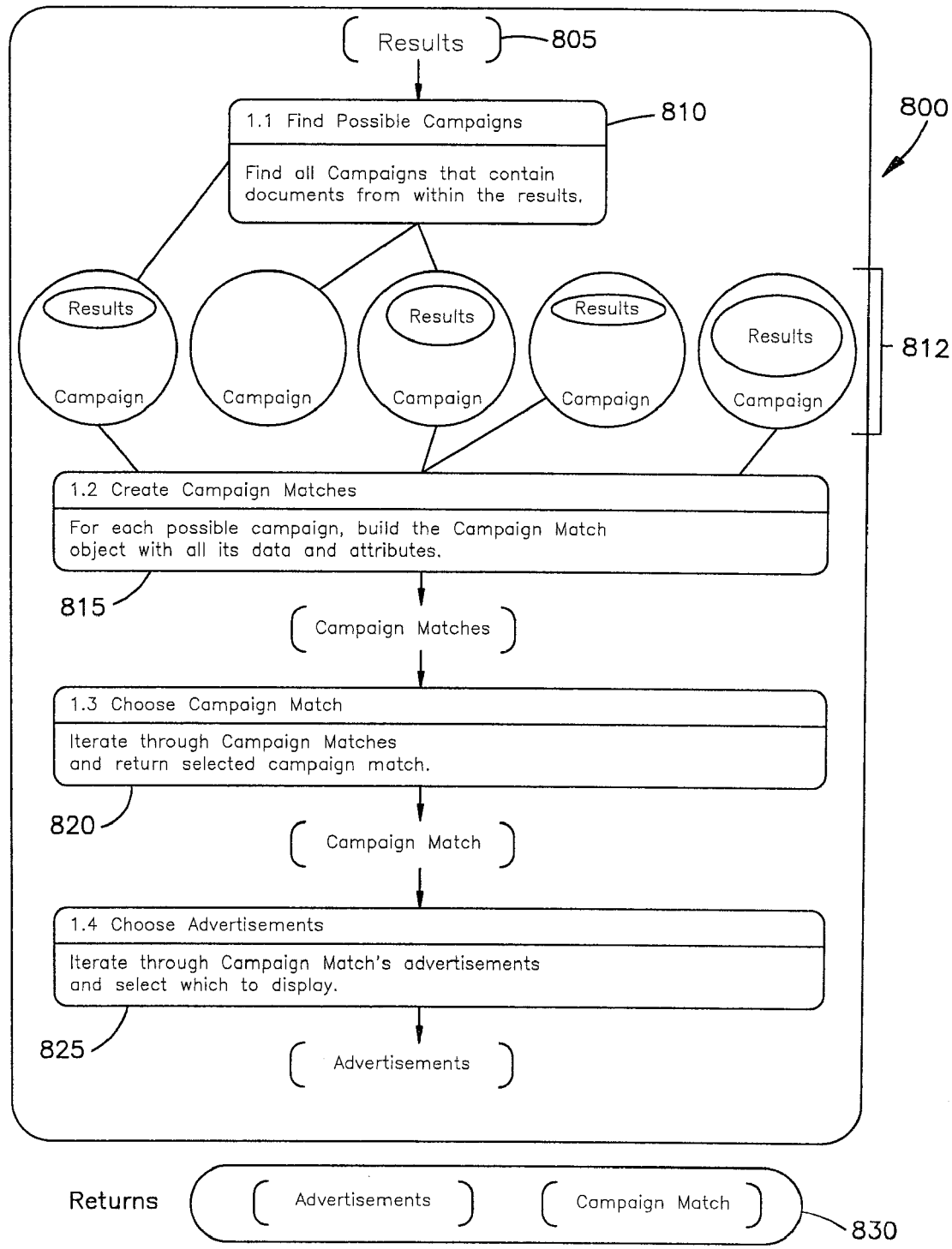
FIG. 8 is a flow diagram depicting a process for determining which advertisements (or result documents) to serve in accordance with one or more embodiments of the invention.

The application receives the selected campaign and advertisements and sends to the user the HTTP response of organic search results along with an advertisement. In such an embodiment, as shown in FIG. 8, the system is preferably configured to cause the ad targeting module 160 to (i) receive a result set from a search engine (step 805), (ii) find all campaigns that contain documents from within the result (step 810), (iii) for each possible campaign, build a Campaign Match object with all its data and attributes (step 815), (iv) iterate through Campaign Matches and return a selected campaign match (step 820), (v) iterate through the Campaign Match's advertisements (step 825), and (vi) select which to display (step 830).

The Ad Targeting Module

The ad targeting module 160 is code written in a programming language running on a computer server or the web application server stack, as described above. The business rules and application logic of the code dictate that the ad targeting module 160 function as described herein. As noted above, the ad targeting module 160 may be programmed in any number of programming languages known in the art to provide functionality for determining a intersection of result sets to campaigns and targeting advertising based thereon. The components involved to achieve this would include, but not be limited to, a module for finding possible campaigns, a module for building campaign match data, a module for choosing a best campaign, and a module for choosing a best advertisement. A preferred method for each of these core modules and processes is described below.

Find Possible Campaigns Module

Figure 9:
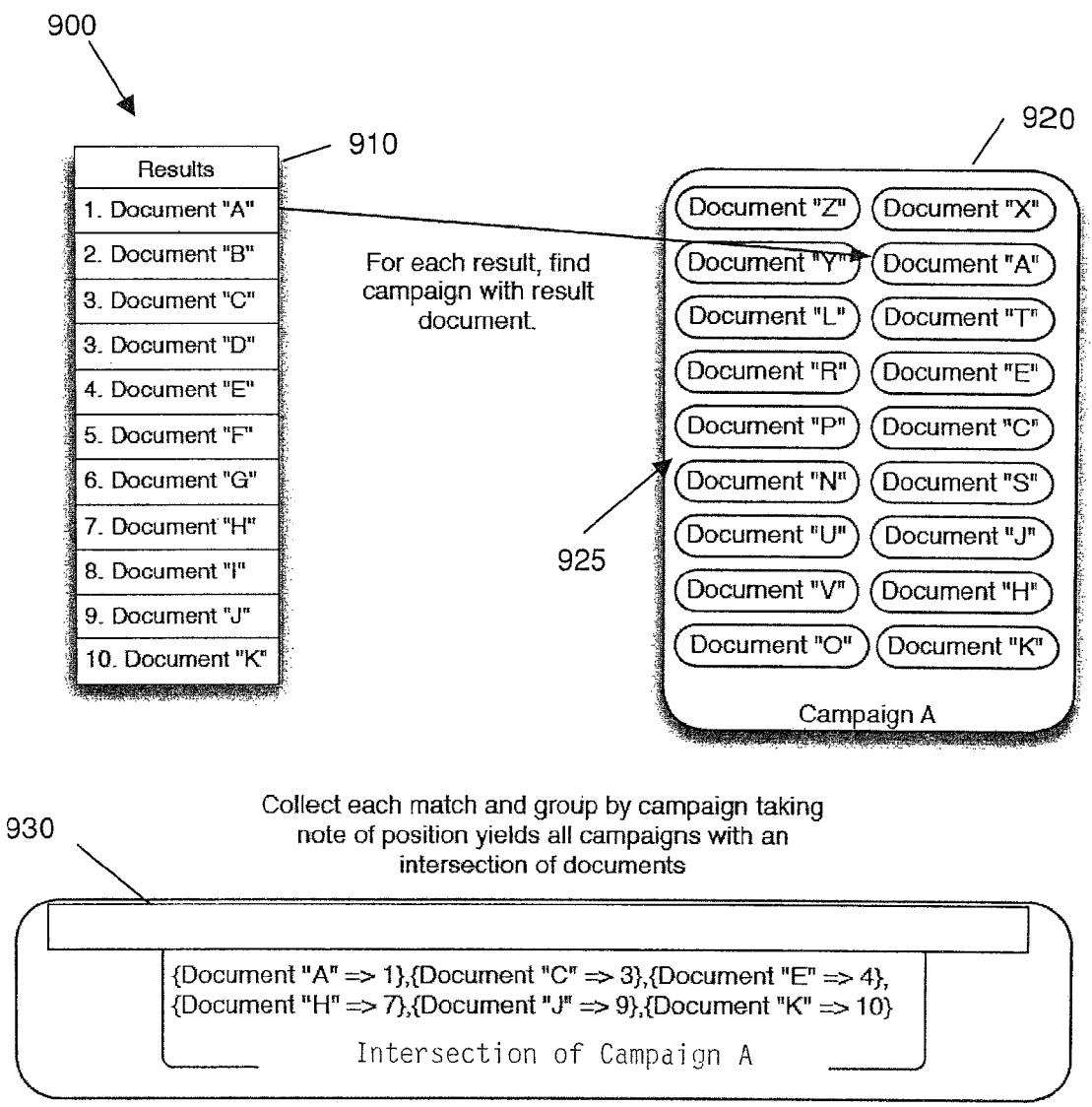
FIG. 9 is a flow diagram depicting a process for finding possible campaigns with intersection matches in accordance with one or more embodiments of the invention.

With reference to FIG. 9, a flow diagram 900 of a preferred operation of the Find Possible Campaigns Module is shown. If a relational database model is employed, as described in the data model and exemplary environment, then documents and campaigns have unique ids and are joined together through campaign documents. In an alternate embodiment, a non-relational database can be employed to recreate these relationships, such as in a key/value store or document store, a campaign with a unique key would be composed of its own attributes along with the unique key of every document within it.

Regardless of the particular embodiment employed, finding all possible campaigns may be accomplished, by way of example, in one of two ways: 1) by iterating through the result documents 910 and then iterating through all campaigns 920 and their documents 925, while compiling each intersection 930 represented by the result document being present in the campaign's documents, or 2) by iterating through all campaigns 920 and their documents 925 and then iterating through all result documents 910, while compiling each intersection 930 represented by the campaign document being present in the result's documents. These methods are the converse of each other, but produce the same result, which is the intersection of each campaign's documents and the result's documents.

Additionally, this systematic iteration of matching items within sets is the lowest-level possible implementation and is abstracted out into higher-level implementations within programming languages and system. For example, SQL may be used to accomplish this step. Selecting all campaign documents where the campaign document's document id is within the collection of document id's present in the result set produces a data set from which the intersection of each campaign and the result set can be extrapolated. Grouping this data set by campaign id would yield a histogram showing the campaign id and the frequency of occurrence within the data set, which is the intersection size. Each individual row represents each intersection between a result set and campaign. Thus, the result of the high-level SQL implementation produces the same result as the lowest-level implementation of manual iteration of matching.

Build Campaign Match Data Module

Figure 10:
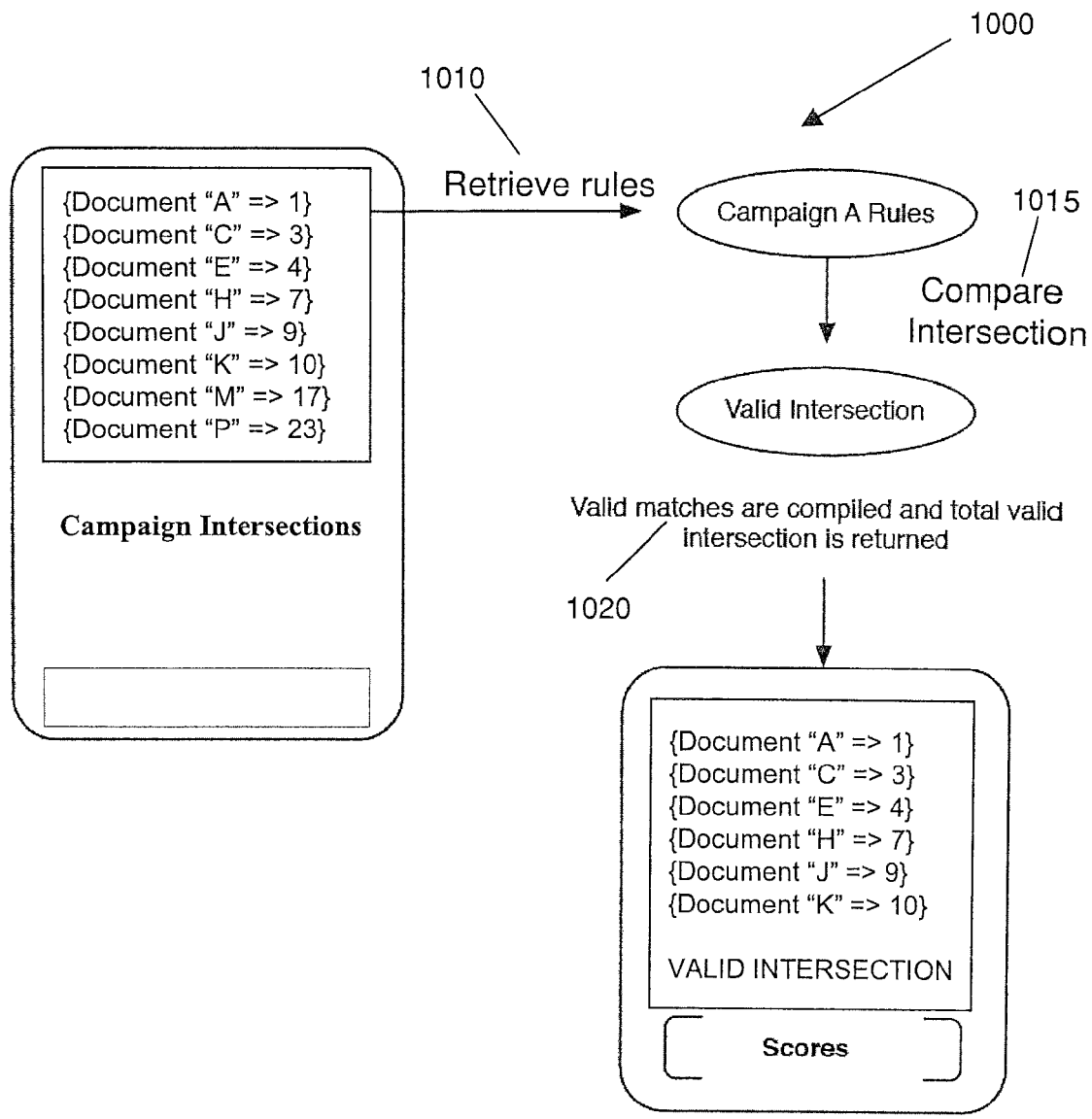
FIG. 10 is a flow diagram depicting a process for building campaign match data in accordance with one or more embodiments of the invention.

With reference to FIG. 10, a flow diagram 1000 depicts a preferred embodiment of the operation of the Build Campaign Match Data module. Once all campaigns that contain documents from the search results are identified and the intersection of a campaign and a result is determined, the build campaign match data module takes over and receives all possible campaign matches and their respective intersections with result sets. The purpose of this module is to compile and calculate more data about the campaigns and the intersection.

In a preferred embodiment, the first task involves excluding intersections between a document and result set where the document does not meet the required constraints of the Campaign Document. For example, a Campaign Document might have an attribute 'minimum rank' defined, as may be defined in a set of rules. In other words, rules may be defined, for example, to ensure that no document in a campaign that is ranked in a results set outside the top 10 qualifies as a valid match. This attribute could be used to enforce a rule wherein the intersection between the document and the result can only occur when the document is higher than a minimum rank within the ordered result set. If a Campaign Document has a constraint that is not met, it might not be used within the Build Campaign Match Data module, depending on the business logic the particular embodiment chooses to enforce.

Given that every campaign has a total number of documents within it, defined as its size, and that every result set has a total number of documents within it, also defined as its size, a few, but by no means a comprehensive, key proportions, percentages, and ratios are derived which describe the campaign's relation to the result set.

Once the rules are retrieved, in step 1010, a comparison between the intersection and the rules is performed, in step 1015. Then, in step 1020, valid matches can be compiled and a total valid intersection for the campaign can be returned for each campaign. As can be seen in the example of FIG. 10, Documents "M" and "P" are not valid matches, because they violate the illustrative rule that limits valid matches to documents appearing in the top 10 of the results set.

The first of which is the intersection size over the campaign size, or the ratio of intersection to campaign, or the percentage of the campaign. This number represents how much of the campaign is represented by the intersection of campaign documents and search result documents. The I/C is an especially valuable variable because conceptually, the larger the I/C, the more likely it is that the search is related to the campaign. That is to say, if a campaign with 100 documents has a intersection of 90 with the result set, 90% of the campaign is represented in the search, or a I/C of 9/10. Ninety percent of a campaign appearing as organic search results suggests that the campaign is at least somewhat related to the search.

However, the I/C, used alone for relevancy, may be biased toward smaller campaigns and larger results. With small campaigns, less documents are required to generate a high I/C, i.e., a campaign of 25 documents might share a intersection of 20 with a result set that is 1000 documents in size. While the I/C in this case is 4/5, because the search results are composed of so little of the campaign, the relation between the campaign and the search is less compelling.

Thus, in a preferred embodiment, a second variable is calculated by the build campaign match data module, namely, the intersection size over the results size (I/R), or the ratio of intersection to results, or the percentage of results. This number represents how much of the results are composed by documents within the intersection. The I/R is an especially valuable variable because conceptually, the larger the I/R, the more likely it is that the search is related to the campaign. That is to say, if a campaign with 100 documents has a intersection of 90 with a result set of size 100, 90% of the results are represented by the campaign, or a I/R of 9/10. Similar to the I/C, the higher the I/R, the more likely it is that the campaign and the search are related, as 90% of the organic search results being composed of documents predefined in a campaign suggest that the search and campaign are related.

Furthermore, the I/R has the opposite bias of the I/C. Where a high I/C is vulnerable to small campaigns accounting for a small portion of larger results, which as explained above, may negate the suggested relevancy of the campaign to the search despite the high I/C, a high I/R may be vulnerable to a small result set being composed mostly of campaign documents in a large campaign, thereby potentially negating the relevancy of the campaign to the search results despite the high I/R. I/C and I/R having opposite vulnerabilities means that these two variables, when used together will likely cancel each other's bias out and suggest a key principle of result-based advertising targeting, namely, that "general" searches should trigger "general" campaigns, and "specific" searches should trigger "specific" campaigns. It will be understood by person of skill in the art that any combination (e.g., one alone, or both in combination) or weighting (e.g., a combination in which one ratio is weighted more heavily than the other) may be used within the scope of the present invention.

The function of the build campaign match data is to provide the ad targeting module with any and all variables based upon I, C, R, and according to the present embodiment focusing on I/C, I/R, that describe the correlation between a campaign and a search result. Since it is likely that there will be more than one matching campaign to a result set, the Choose Best Campaign module functions to order the matching campaigns and choose a most appropriate match, thereby resolving any potential conflicts.

Choose Best Campaign Module

Figure 11:
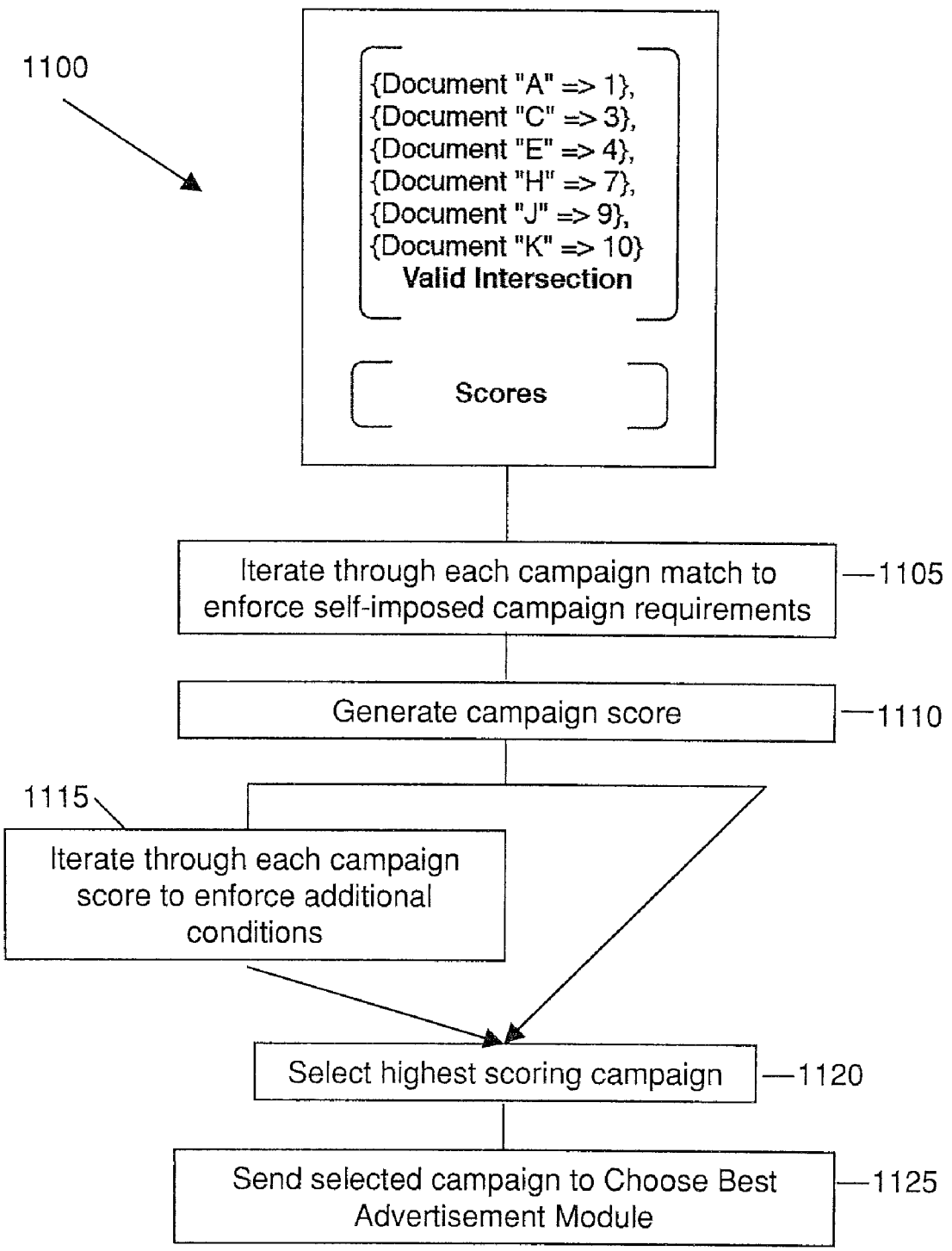
FIG. 11 is a flow diagram depicting a process for choosing the best campaign match in accordance with one or more embodiments of the invention.

Once the Build Campaign Match Data Module has compiled and further expanded upon the variables provided by the intersection of a result set and a campaign, the Choose Best Campaign module receives this data and selects the most appropriate campaign, according to the methods, described herein, and shown, for example, in the preferred process 1100 of FIG. 11. In a preferred embodiment, the Choose Best Campaign module first iterates through each Campaign Match to enforce any self imposed requirements of a campaign, in step 1105. Such a requirement may be defined within the Campaign, such as, but no limited to, requiring that the intersection of the campaign and the result contain at least a certain percentage of documents within a certain percentage of the results. In other words, a Campaign may require that at least 50% of the intersection be located within the top 10% of results, as ordered by the Search process.

To simplify the plethora of variables based upon the C, R, I that the Build Campaign Match Data module can generate, the Choose Best Campaign module will preferably reduce these variables to produce a Campaign Score, in step 1110. The Campaign Score is a temporary attribute that describes the campaign's relation to the current result set and gets defined by the choose best campaign module. According to the current embodiment, a campaign's score is its I/C+I/R. In another embodiment, a campaign's score might be based upon any number of formulas using a campaign's match data. After the score is calculated, the Choose Best Campaign module sorts the possible campaigns by score in descending order so that the highest scoring campaign is first and the lowest scoring campaign last.

At this point, the Choose Best Campaign method could simply select the highest scoring campaign, in step 1120, or it could iterate through the campaigns to ensure they meet certain conditions of the campaign, in step 1115. For example, a campaign could be created with any number of thresholds that ensure that the campaign matches' corresponding value is greater than or equal to the threshold. In one embodiment, a campaign might have a I/C threshold of 0.20, which would enforce that at least 20% of the campaign was represented in the result set. In another embodiment, a campaign might have a campaign score threshold, that could be used as a more global threshold for the campaign, suggesting that in whatever method the Choose Best Campaign Module determines the Campaign Score, a campaign must have a score greater or equal to the campaign score threshold of a campaign.

The Choose Best Campaign Module can preferably generate a Campaign Score for each Campaign according to its configuration. After ordering all the possible campaign matches by sorting the campaign's by their score in descending order, the module will iterate through each match and select the first match that has no other rules or conditions which would disqualify that campaign. In step 1125, the Ad Targeting Module 160 sends the selected campaign to the Choose Best Advertisement module, which will choose the best advertisements of the selected campaign as described below.

Choose Best Advertisement Module

Choosing the best advertisements from a selected campaign is a highly configurable process. Depending on the specific business rules that the ad targeting module might enforce, a variety of methods for selecting a best advertisement exist.

In a currently preferred embodiment, the choose best advertisement is programmed to enforce that no more than three individual and unique advertisers may be active in any given campaign that is selected by the Choose Best Campaign module. That is to say, for each result set, once a campaign is paired to the results, no more than three advertisements are displayed and each advertisement must be from a unique advertiser. To fulfill these requirements, the current embodiment of the Choose Best Advertisement method first finds all the Campaign Advertisements for the selected campaign and groups the advertisements by advertisers. The choose best advertisement module then iterates through these advertisers and determines if any of their advertisements, which are documents within the domain of all documents, appear organically within the result set. If so, the document is removed from the result set and the advertisement is selected.

This process preferably repeats until three advertisements are selected. If remaining advertisement slots are still present, the choose best advertisement module uses the remaining advertisers whose advertisements did not occur naturally within the result set, and selects remaining advertisers based on the highest total spending across all campaigns. The choose best advertisement module then selects an advertisement for each remaining slot from these advertisers at random.

General Examples

To better illustrate the invention described above, the following examples are provided.

A. Vertical Search

The first example speaks to how this ad targeting module configures over a vertical search engine for architectural and design products and materials. The exemplary product catalog hosts over 50,000 products, listed by over 1,800 manufacturers. When a visitor to the site searches for 'toilet', he/she is returned 763 results, listed by 16 manufacturers. Result pages for 'lavatories,' 'commercial toilet,' 'residential toilet,' 'hospitality toilet,' 'tankless toilet,' and 'wall mount toilet' are similarly saturated with products and manufacturers vying for top placement. In many of these instances, Kohler may dominate the first page of results, so it is unlikely that a visitor would come to products listed by any other manufacturer. In turn, both Duravit and TOTO, competing brands, for example, may decide to purchase advertisements to better compete against Kohler.

In this example, keyword advertising will not sufficiently serve the needs of either advertiser without tenuous research into meaningful and effective keywords. In order for Duravit or TOTO to purchase comprehensive coverage, they'd each need to identify leading keywords such to trigger an advertising campaign.

As a further more simplified example, Duravit creates the 'residential plumbing' campaign and assigns all the residential plumbing products in the catalog to said campaign. In an alternate embodiment, a supervising member for the product catalog might create this campaign for Duravit. Note, the campaign can be created by anyone, provided it accurately represents Duravit's interest in this example. For this example, the 'residential plumbing' campaign includes 9,483 products. Once Duravit has carved this body of unique specific documents (the campaign), it will then decide on advertisements it wants displayed with said campaign. Duravit can include as many advertisements as it wants. Once this is complete, Duravit's 'residential plumbing' campaign is now ready to be activated.

TOTO likewise creates a 'toilet' campaign and assigns 476 toilet products from the catalog to said campaign. TOTO, like Duravit, additionally specifies advertisements to display with the 'toilet' campaign.

Now when a visitor searches for 'toilet', the ad targeting module will determine which (if any) campaign(s) is appropriate for the result set. In this example, the ad targeting module calculates the following metrics such to determine relevancy:

For 'toilet' campaign:
C=476
R=763
I=476
PC=100
PR=62.3853211009174
CR=476:763
RC=763:476

For 'residential plumbing' campaign:
C=9,483
R=763
I=644
PC=84.4036697247707
PR=6.79109986291258
CR=9,483:763
RC=763:9,483

These metrics are used to calculate a relevancy score for both the 'residential plumbing' and 'toilet' campaigns. Accordingly, the 'toilet' campaign is the best match, therefore, an advertisement from said campaign, belonging to TOTO, displays over the result set. This advertisement was activated without any dependence on the initial query or any keyword(s), but rather based on the result-set only.

B. Horizontal Search

In a second example, an example of how the ad-targeting module would operate over a horizontal search engine (e.g., Google, Yahoo, Live, or Bing) is provided. Currently, this horizontal search engine is indexing more than ten billion websites. By way of background, a visitor to one of the search engine sites listed above would search for 'Ruby on Rails' which would cause approximately 7 million plus results and several advertisements triggered via the query. In the example being described, the first organic search result is Ruby on Rails (rubyonrails.org), and the first advertisement is for domain name registration services related to the domain 'Ruby on Rails' at GoDaddy (godaddy.com)—a popular domain name registrar.

However, under currently available keyword-search based systems, if that same visitor were to search for 'ActiveRecord,' a major component of the Ruby on Rails framework, he/she would see 1 million plus search results and no advertisements. Thus, while the search results produce relevant matches, such as the first search result, which is Class: Active Record::Base (api.rubyonrails.org/classes/ActiveRecord/Base.html), a sub-domain of rubyonrails.org (the web site containing information on how to implement Ruby on Rails. Undoubtedly, GoDaddy, the top advertiser for the 'Ruby on Rails' keyword would likely desire to have its Ruby on Rails at GoDaddy advertisement display for searches highly relevant to the Ruby on Rails platform, such as 'ActiveRecord.'

Furthermore, there are many more specific and long-tail queries like 'ActiveRecord,' such as, for example, 'ActionController,' 'ActiveMailer,' and 'ActionSupport,' that GoDaddy might have interest in as well. All the terms that are highly relevant to the Ruby on Rails platform, but are long-tail and require deep knowledge of Ruby on Rails to be identified by advertisers. There are many examples of "long-tail" type search queries that may be missed by keyword advertisers. In addition, because of the almost infinite number of long-tail type search queries that can be crafted for any given search, keyword advertisers may be missing out on a number of searches that would be highly relevant for their targeted advertisements. Moreover, the search engine company, e.g., Google, misses out on an untold number of opportunities to provide ad impressions that could result in click revenue from its advertisers. Thus, as web searches craft ever increasingly complex long-tail search queries and/or attempt to craft more targeted searches that will find specific results as opposed to more general high level categories, there will likely be an increasing number of searches to which both advertisers and search engine entities alike will find keyword based advertising unsatisfactory.

For example, it reasons that a Ruby on Rails developer would search less for the very general term 'Ruby on Rails,' and more for specific API definitions that are used within the framework. Thus, an advertiser hoping to capture the attention of Ruby on Rails developers would be better served by being able to serve advertisements over the long-tail keywords, such as 'ActiveRecord,' but the difficulty in identifying the almost infinite number of keywords in this context makes keyword based advertising a hit-or-miss task.

However, in an embodiment of the present invention, GoDaddy would create a 'Ruby on Rails' campaign and assign every webpage belonging to the top level domain, rubyonrails.org, to the campaign. In this embodiment, GoDaddy might also specify placement or position (e.g., position 1-10 v. 11-20) in the results set as one of the criteria that determined the triggering of its advertisement. For example, GoDaddy would be able to specify that the result documents must appear within the first 20 results. If the result documents do not appear within that threshold, the campaign would not be triggered.

Additionally, to further determine relevancy of intersections (both in vertical and horizontal examples), the location of the intersection within the result set might be weighted. For example, if Campaign A has a high PR, percentage of results, but the intersection mostly lies within the results at the end of the result set, e.g., documents 500-1000, and Campaign B has a lower PR, but the intersection mostly lies within the beginning of the result documents, e.g., documents 1-500, Campaign B might in fact be more relevant.

C. Location-Specific Search

In a third example, the ad-targeting module is configured to operate over a location-specific search engine (e.g., Google Maps, MapQuest, Yellow Pages, Yelp). In one example, the location-specific search engine is indexing various restaurants, service providers, or vendors related to a particular geographic region.

In this example, a local pizzeria is looking to advertise its food to local residents. Accordingly, this pizzeria creates a location-specific campaign for 'zip code 10021.' This campaign is meant to include all possible results (documents) that are located within that region. When a user searches anything, the ad-targeting module seeks out the intersection between contending campaigns and said results such to trigger the most relevant local advertisement(s). As a further example, many search engines permit search queries to include a zip code, such as 'movers 10021,' where a user is looking for a furniture moving company that services the 10021 zip code area. In this case, the pizzeria ad may be displayed because it is likely that a sufficient number of results would for the 10021 zip code would be displayed as a part of the results set.

While there have been shown and described fundamental novel features of the invention as applied to the exemplary embodiments thereof, it will be understood that omissions and substitutions and changes in the form and details of the disclosed invention may be made by those skilled in the art without departing from the spirit of the invention.

The invention claimed is:

1. A computer-implemented method for selecting one or more targeted advertisements to be displayed along with a set of search results, wherein a computer system for implementing the method is programmed with an ad targeting module including a build campaign match sub-module, a choose best campaign sub-module and a choose advertisement sub-module, and includes a database storage system storing one or more campaigns each campaign being associated with a set of documents and at least one advertisement, the method comprising:
   (i) analyzing the search result set, using the build campaign match sub-module of the ad targeting module by determining, for each of the identified campaigns, a campaign intersection size score representing a percentage of a number of documents within the search results set corresponding with documents within each of the identified campaigns; and determining, for each of the identified campaigns, a results intersection size score representing a percentage of a number of documents within each of the campaigns corresponding with documents within the search results set to calculate at least one intersection score between the search result set and at least one of the one or more campaigns wherein the one or more campaigns comprise a listing of documents that represent the likely results for a search in an advertiser's area of interest;
   (ii) selecting a matching campaign from the one or more campaigns, using the choose best campaign sub-module, based on the at least one intersection score, and
   (iii) selecting at least one advertisement from the matching campaign, using the choose advertisement sub-module; and
   (iv) causing the at least one advertisement selected from the matching campaign to be displayed with the search result set.

2. The method of claim 1, wherein the search results include links to documents within a set of documents related to a subject.

3. The method of claim 2, wherein the documents are web pages and the links are uniform resource locators.

4. The method of claim 1, wherein the search results are generated by a search engine internal to the computer system.

5. The method of claim 1, wherein the search results are generated by a search engine external to the computer system and transmitted to the computer system via a network.

6. The method of claim 5, wherein the at least one advertisement selected from the matching campaign to be displayed with the search result set is transmitted to an external computer system associated with the search engine.

7. The method of claim 1, further comprising: identifying all campaigns that have at least one document relating to the search results set using a find all possible campaigns sub-module of the ad targeting module.

8. The method of claim 7, wherein the step of selecting a matching campaign from the one or more campaigns, using the choose best campaign sub-module, further comprises:
calculating a campaign score for each of the identified campaigns wherein the campaign score sums the campaign intersection size score and the results intersection size score.

9. The method of claim 8, further comprising selecting one of the identified campaigns based on the campaign score.

10. The method of claim 9, wherein the one advertisement for each of the selected campaigns are displayed according to the campaign score with the campaign having the higher campaign score being given a better display position relative to the other campaigns.

11. The method of claim 8, further comprising: selecting a plurality of campaigns from the identified campaigns based on the campaign scores for each of the identified campaigns; and causing the display of one advertisement for each of the selected campaigns.

12. A system for selecting one or more targeted advertisements to be displayed along with a set of search results, the system comprising:
a computer system programmed with an ad targeting module including a build campaign match sub-module, a choose best campaign sub-module, and a choose advertisement sub-module;
a database storage system storing one or more campaigns each campaign being associated with a set of documents and at least one advertisement;
wherein the computer system executes the ad targeting module to:
(i) identify all campaigns from the one or more campaigns that have at least one document relating to a search result set generated by a search engine in response to a keyword;
(ii) analyze the search results set, using the build campaign match sub-module of the ad targeting module by determining, for each of the identified campaigns, a campaign intersection size score representing a percentage of a number of documents within the search results set corresponding with documents within each of the identified campaigns; and determining, for each of the identified campaigns, a results intersection size score representing a percentage of a number of documents within each of the campaigns corresponding with documents within the search results set, to calculate at least one intersection score between the search result set and at least one of the one or more campaigns wherein the one or more campaigns comprise a listing of documents that represent the likely results for a search in an advertiser's area of interest;
(iii) select a matching campaign from the one or more campaigns, using the choose best campaign sub-module, based on the at least one intersection score, and
(iv) select at least one advertisement from the matching campaign, using the choose advertisement sub-module; and
(v) cause the at least one advertisement selected from the matching campaign to be displayed with the search result set.

13. The system of claim 12, wherein the search results include links to documents within a set of documents related to a subject.

14. The system of claim 13, wherein the documents are web pages and the links are uniform resource locators.

15. The system of claim 12, wherein the search results are generated by a search engine internal to the computer system.

16. The system of claim 12, wherein the search results are generated by a search engine external to the computer system and transmitted to the computer system via a network.

17. The system of claim 16, wherein the at least one advertisement selected from the matching campaign to be displayed with the search result set is transmitted to an external computer system associated with the search engine.

18. The system of claim 12, wherein the computer system executes the ad targeting module to:
identify all campaigns that have at least one document relating to the search results set using a find all possible campaigns sub-module of the ad targeting module.

19. The system of claim 18, wherein the step of selecting a matching campaign from the one or more campaigns, using the choose best campaign sub-module, further comprises:
calculating a campaign score for each of the identified campaigns wherein the campaign score sums the campaign intersection size score and the results intersection size score.

20. The system of claim 19, further comprising selecting one of the identified campaigns based on the campaign score.

21. The system of claim 20, wherein the one advertisement for each of the selected campaigns are displayed according to the campaign score with the campaign having the higher campaign score being given a better display position relative to the other campaigns.

22. The system of claim 19, wherein execution of the ad targeting module further comprises: selecting a plurality of campaigns from the identified campaigns based on the campaign scores for each of the identified campaigns; and causing the display of one advertisement for each of the selected campaigns.

23. A computer program product including a computer usable medium having a computer readable program code embodied therein, said computer readable program code adapted to be executed to implement a method for selecting one or more targeted advertisements to be displayed along with a set of search results, said method comprising:
providing a system including a computer system and a database storage system storing one or more campaigns each campaign being associated with a set of documents and at least one advertisement, the computer system programmed with distinct software modules, and wherein the distinct software modules include an ad targeting module including a build campaign match sub-module, a choose best campaign sub-module, and a choose advertisement sub-module;
identifying all campaigns that have at least one document relating to a search result set generated by a search engine in response to a keyword;
analyzing the search results set, using the build campaign match sub-module of the ad targeting module by determining, for each of the identified campaigns, a campaign intersection size score representing a percentage of a number of documents within the search results set corresponding with documents within each of the identified campaigns; and determining, for each of the identified campaigns, a results intersection size score representing a percentage of a number of documents within each of the campaigns corresponding with documents within the search results set, to calculate at least one intersection score between the search result set and at least one of the one or more campaigns wherein the one or more campaigns comprise a listing of documents that represent the likely results for a search in an advertiser's area of interest;

selecting a matching campaign from the one or more campaigns, using the choose best campaign sub-module, based on the at least one intersection score, and selecting at least one advertisement from the matching campaign, using the choose advertisement sub-module; and causing the at least one advertisement selected from the matching campaign to be displayed with the search result set.

24. The computer program product of claim 23, wherein the search results include links to documents within a set of documents related to a subject.

25. The computer program product of claim 24, wherein the documents are web pages and the links are uniform resource locators.

26. The computer program product of claim 23, wherein the search results are generated by a search engine internal to the computer system.

27. The computer program product of claim 23, wherein the search results are generated by a search engine external to the computer system and transmitted to the computer system via a network.

28. The computer program product of claim 27, wherein the at least one advertisement selected from the matching campaign to be displayed with the search result set is transmitted to an external computer system associated with the search engine.

29. The computer program product of claim 23, wherein the computer system executes the ad targeting module to: identify all campaigns that have at least one document relating to the search results set using a find all possible campaigns sub-module of the ad targeting module.

30. The computer program product of claim 29, wherein the step of selecting a matching campaign from the one or more campaigns, using the choose best campaign sub-module, further comprises: calculating a campaign score for each of the identified campaigns wherein the campaign score sums the campaign intersection size score and the results intersection size score.

31. The computer program product of claim 30, further comprising selecting one of the identified campaigns based on the campaign score.

32. The computer program product of claim 31, wherein the one advertisement for each of the selected campaigns are displayed according to the campaign score with the campaign having the higher campaign score being given a better display position relative to the other campaigns.

33. The computer program product of claim 30, wherein execution of the ad targeting module further comprises: selecting a plurality of campaigns from the identified campaigns based on the campaign scores for each of the identified campaigns; and causing the display of one advertisement for each of the selected campaigns.

* * * * *